United States Patent [19]
Hoxmeier et al.

[11] Patent Number: 5,543,458
[45] Date of Patent: Aug. 6, 1996

[54] PROCESS FOR MAKING GRAFT BLOCK COPOLYMERS BY GROWING ANIONIC POLYMER CHAINS FROM FUNCTIONALIZED POLYOLEFIN BACKBONES

[75] Inventors: Ronald J. Hoxmeier; Robert C. Job; Bridget A. Spence; Donn A. DuBois, all of Houston, Tex.

[73] Assignee: Shell Oil Company, Houston, Tex.

[21] Appl. No.: 381,242

[22] Filed: Jan. 31, 1995

[51] Int. Cl.$^6$ .............................. C08F 8/42; C08F 255/00
[52] U.S. Cl. .................... 525/271; 525/250; 525/288; 525/268; 525/323
[58] Field of Search ................................ 525/271, 250, 525/288, 268, 323

[56] References Cited

U.S. PATENT DOCUMENTS

| | | | |
|---|---|---|---|
| 3,627,837 | 11/1968 | Webb | 525/108 |
| 3,700,638 | 10/1972 | Kawasaki et al. | 526/97 |
| 3,703,566 | 11/1972 | Duck et al. | 525/250 |
| 3,786,116 | 1/1974 | Milkovich et al. | 525/276 |
| 3,842,059 | 10/1974 | Milkovich et al. | 525/292 |
| 3,862,098 | 1/1975 | Milkovich et al. | 525/292 |
| 3,879,494 | 4/1975 | Milkovich et al. | 525/85 |
| 3,894,119 | 7/1975 | Forbes et al. | 525/241 |
| 3,925,511 | 12/1975 | Loveless | 525/272 |
| 4,078,019 | 3/1978 | Langer, Jr. | 526/180 |
| 4,168,921 | 9/1979 | Blanchard | 403/19 |
| 4,424,308 | 1/1984 | Shannon | 525/308 |
| 4,500,648 | 2/1985 | Malpass | 502/115 |
| 4,581,467 | 4/1986 | Malpass | 556/170 |
| 4,707,521 | 11/1987 | Esneault et al. | 525/250 |
| 4,761,456 | 8/1988 | Lund et al. | 525/250 |
| 4,786,689 | 11/1988 | Lund et al. | 525/250 |
| 4,794,145 | 12/1988 | Lund et al. | 525/250 |
| 4,851,489 | 7/1989 | Malpass | 526/153 |
| 4,853,436 | 8/1989 | Ohata et al. | 525/244 |
| 5,037,890 | 8/1991 | Yokoyama et al. | 525/250 |
| 5,045,597 | 9/1991 | Asanuma et al. | 525/72 |
| 5,081,190 | 1/1992 | Asanuma et al. | 525/288 |
| 5,104,952 | 4/1992 | Babu | 526/279 |
| 5,118,768 | 6/1992 | Job et al. | 526/124.9 |
| 5,122,494 | 6/1992 | Job | 502/125 |
| 5,159,023 | 10/1992 | Cecchin et al. | 525/250 |
| 5,162,445 | 11/1992 | Powers et al. | 525/333.4 |
| 5,192,616 | 3/1993 | Babu | 428/407 |
| 5,227,426 | 7/1993 | Tse et al. | 524/534 |
| 5,272,236 | 12/1993 | Lai et al. | 526/438.5 |
| 5,278,272 | 1/1994 | Lai et al. | 526/438.5 |
| 5,294,678 | 3/1994 | Tse et al. | 525/319 |
| 5,314,957 | 5/1994 | Asanuma | 515/245 |
| 5,380,810 | 1/1995 | Lai et al. | 526/352 |

FOREIGN PATENT DOCUMENTS

| | | |
|---|---|---|
| 0416815A2 | 3/1991 | European Pat. Off. . |
| 91/04995 | 4/1991 | WIPO . |
| 92/12190 | 7/1992 | WIPO . |
| 94/07930 | 4/1994 | WIPO . |

OTHER PUBLICATIONS

D. J. Peterson, *Journal of Organometallic Chemistry*, vol. 9, pp. 373 & 374, 1967.
J. C. Faulk et al., *Journal of Macromolecular Science–Chemistry*, A (7)(8), pp. 1663–1668, 1973.
D. B. Collum, *Accts. Chem. Res.*, vol. 25, pp. 448–454, 1992.

*Primary Examiner*—Irina Zemel
*Attorney, Agent, or Firm*—Donald F. Haas

[57] ABSTRACT

A graft block copolymer is comprised of a completely saturated olefinic backbone with pendant anionic polymer side chains. The polymer is produced by copolymerizing an α-olefin with a monomer which contains a functional group which can be metallated so an anionic monomer can be polymerized therefrom, metallating the copolymer by reaction with metal alkyl or aryl compound and a metallation activator, and growing anionic polymer side chains from the copolymer backbone by reacting an anionically polymerized monomer with the metallated copolymer.

12 Claims, No Drawings

PROCESS FOR MAKING GRAFT BLOCK COPOLYMERS BY GROWING ANIONIC POLYMER CHAINS FROM FUNCTIONALIZED POLYOLEFIN BACKBONES

BACKGROUND OF THE INVENTION

This invention relates to a method for making graft block copolymers and particularly to making saturated graft block copolymers without a hydrogenation step. More particularly, the present invention is a process for making saturated graft block copolymers from polyvinyl aromatic hydrocarbons and functionalized polyolefins.

Anionic polymerization utilizing organo alkali metal initiators has long been used to polymerize conjugated diolefins such as butadiene and isoprene and to copolymerize such diolefins with styrenes and substituted styrenes to make styrene-butadiene-styrene and styrene-isoprene-styrene linear block copolymers and similar linear block copolymers. This reaction is usually carried out in an inert hydrocarbon solvent such as cyclohexane or toluene and it is necessary to rigorously exclude oxygen, water or any impurity that can react with a highly reactive propagating species. Under these conditions, the polymeric molecular weights and block structure can be precisely controlled.

Such polymers contain a large amount of aliphatic unsaturation in the diene blocks. Since saturated polymers have certain advantages over unsaturated polymers, such as oxygen and heat stability, it has been desirable to hydrogenate the aliphatic unsaturation in the conjugated diene blocks and this has been accomplished using any of several hydrogenation processes known in the prior art. For instance, the commonly used method is to use a Group VIII metal, particularly nickel or cobalt, catalysts with a suitable reducing agent such as an aluminum alkyl to catalyze the hydrogenation of these polymers. Recently it has been found that bis(cyclopentadienyl)titanium compounds can also be used in the hydrogenation of these polymers. Excellent saturated linear block copolymers are the result of such processes.

The disadvantage in the prior method of producing saturated linear block copolymers is the necessity for the additional hydrogenation and catalyst removal steps. These steps are equipment and time intensive and thereby increase the complexity and cost of producing linear block copolymers. In addition, the hydrogenation catalysts are sensitive to certain poisons making hydrogenation of polymers containing particular functional groups or coupling agent residues difficult or impossible. It would be highly advantageous to have a process by which saturated block copolymers could be produced without the necessity of a hydrogenation step. The present invention provides such a process and also produces graft block copolymers with zero residual unsaturation.

Others have attempted to lithiate EPDM polymers as a first step to the manufacture of saturated grafted polymers (see for instance U.S. Pat. Nos. 4,761,546; 4,786,689; and 4,794,145). These reactions generally involve the metallation of allylic sites in the olefinic moieties of the diene monomer by reaction with alkyl lithium compounds in the presence of activators. These lithiated sites then serve as initiator sites to initiate the polymerization of subsequently added styrene monomer to grow grafted polystyrene blocks.

This method of synthesis does not present a practical process for large scale manufacture of these materials because lithiation efficiencies of only 25 to 35 percent have been achieved. This leaves 65 to 75 percent of unreacted alkyl lithium in solution which, upon addition of styrene monomer, polymerizes the styrene and forms unacceptably large amounts of homopolystyrene, thereby adversely affecting polymer properties. When more forcing conditions are employed to achieve higher lithiation efficiencies, such as higher reaction temperatures, substantial thermal decomposition of the alkyl lithium compounds occurs. An additional disadvantage of this method is that the resulting thermoplastic elastomer contains from about 1 to 4% unsaturation in the rubber backbone due to diene comonomer. These unsaturated sites are prone to degradation in the presence of heat and/or chemicals resulting in loss of material properties. The present invention provides a different method of producing the desired materials which does not have these problems.

SUMMARY OF THE INVENTION

The present invention provides a process of producing graft block copolymers which comprises (a) copolymerizing an $\alpha$-olefin or mixtures of $\alpha$-olefins with a monomer which contains a functional group which can be metallated so an anionic monomer can be polymerized therefrom, preferably a 1-alkenyl alkyl or arylsilane, to produce a copolymer backbone, (b) metallating the functional groups on the copolymer by reaction with a metal alkyl or aryl, preferably an alkyl lithium compound, and a metallation activator such as N,N,N',N'-tetramethylethylenediamine (TMEDA), and (c) reacting the metallated copolymer with an anionically polymerizable monomer to grow pendant polymer side chains from the copolymer backbone. The present invention also includes a graft block copolymer comprised of a 100% saturated olefinic backbone with pendant anionic polymer side chains.

The graft block copolymers of this invention may be thermoplastic elastomers, tough impact resistant plastics, or stiff plastics. Thermoplastic elastomers can be formed from an amorphous polymer backbone and glassy or semicrystalline polymer pendant grafts which phase separate (through differences in solubility parameter or crystallinity) from the backbone to form a physically crosslinked network which will be load supporting. When the product graft block copolymer is to be used in applications requiring substantial material strength, then it is preferred that the graft block copolymer contain, on average, at least two grafts. Tough, impact resistant plastics can be formed from an amorphous polymer backbone and glassy or semicrystalline pendant grafts when the weight fraction of the pendant graft is greater than about 0.50. In this case, the graft polymer phase will be the matrix and the amorphous polymer backbone must phase separate and will be dispersed. Tough, impact resistant plastics can also be formed from a glassy or semicrystalline polymer backbone with phase-separated pendant amorphous polymer grafts. Stiff plastic polymers can be formed from glassy or semicrystalline polymer backbones with glassy or semicrystalline polymer grafts, which may exist in a single compatible phase or be phase-separated.

The most preferred embodiment of the present invention involves making a saturated graft block copolymer without the necessity of a hydrogenation step. This can be done when the anionically polymerizable monomer is a vinyl aromatic hydrocarbon, or, more generally, an anionically polymerizable monomer with only one olefinic moiety such as t-butylmethylacrylate, acrylonitrile, etc. Thus, polyvinyl aromatic hydrocarbon, preferably polystyrene, polymer side chains may be grown from the saturated olefinic backbone to create a saturated thermoplastic elastomer.

The process of the present invention is characterized by high lithiation efficiencies. Lithiation efficiencies of 50 to 95 percent are achievable at relatively mild conditions, i.e. 25° C. for 16 hours or 1 hour @ 50° C. Thus, the amount of homopolystyrene or other anionically polymerized homopolymer produced during the last step of the process is diminished.

DETAILED DESCRIPTION OF THE INVENTION

The first step of this process involves copolymerizing an α-olefin with a 1-alkenyl functionalized monomer to form a copolymer which is intended to form the backbone of the graft block copolymer of the present invention. This polymerization step may be carded out by using a Ziegler-Natta or metallocene catalyst polymerization process or by using a cationic polymerization process. Other possible methods include free radical or Lewis acid catalyzed processes.

In general, any α-olefin can be used in the practice of this invention but it is preferred that the α-olefin be a $C_2$ to $C_{30}$ olefin. The choice of α-olefin will depend on the intended application for the product graft block copolymer. If a soft, thermoplastic elastomer is desired, then the graft block copolymer will be composed of an amorphous polymer backbone and glassy or semicrystalline polymer grafts. In this case, it is preferred that the α-olefin be a $C_4$ to $C_{30}$ olefin or a mixture of $C_2$ to $C_{30}$ olefins. These olefins are preferred because they invariably produce amorphous materials with relatively low glass transition temperatures ($T_g$). When graft block copolymers are produced from these olefinic backbones and glassy or semicrystalline anionic polymer grafts as described above, the low $T_g$ of the polyolefin provides for retention of elastomeric properties of the graft block copolymer down to low temperatures and a broad service temperature range. $C_4$ to $C_{16}$ α-olefins and mixtures thereof are preferred because they produce soft, tacky amorphous polymer.

If a tough, impact resistant plastic is desired composed of an amorphous polymer backbone and glassy or semicrystalline polymer grafts in which the weight fraction of the grafts is greater than about 0.50, then an α-olefin that produces an amorphous polymer will again be chosen. It is preferred that the α-olefin be a $C_4$ to $C_{30}$ olefin or a mixture of $C_2$ to $C_{30}$ α-olefins because the low $T_g$ of the product polymer will allow the graft block copolymer to retain ductile behavior of the dispersed phase down to low temperatures and a broad service temperature range. If a tough, impact resistant plastic is desired composed of a glassy or semicrystalline polymer backbone and amorphous polymer grafts then α-olefins that produce a glassy or semicrystalline polymer will be chosen. In this case, it is preferred that the α-olefin be a $C_2$ to $C_5$ olefin. If a stiff plastic material is desired then α-olefins that produce a glassy or semicrystalline polymer will be chosen. In this case, it is preferred that the α-olefin be a $C_2$ to $C_5$ olefin.

There are many monomers which can be used to place "hooks" in the backbone from which anionic polymers can be grown. Specifically included within the scope, of this invention are monomers of the formula

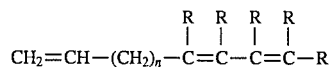

where $n \geq 0$ and where R may be alkyl or hydrogen and may be different or the same. 1,3,7-octatriene is one example. Other preferred monomers are those having the formula:

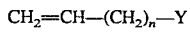

where $n \geq 0$ up to 12 and Y is selected from the group including alkylsilane groups, arylsilane groups, cyclic alkyl containing phosphorous, phosphorous groups of the formula P—$Z_2$ where Z is alkyl or aryl or combinations of these.

In general, any alkenyl alkyl or aryl silane can be used in the present invention but the preferred alkenyl alkyl or aryl silane compounds have the formula:

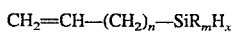

wherein n is 0 or an integer of from 1 to 12, R is alkyl or aryl, preferably methyl, phenyl, or ethyl, x is 0 or 1, m is 2 or 3, and x+m=3. The most preferred alkenyl silanes for use herein are allyltrimethylsilane and allyl dimethylsilane because they are most reactive to copolymerization with α-olefins.

Methods for carrying out the copolymerization of the α-olefin and the 1-alkenyl functionalized monomer include the use of metallocene and Ziegler-Natta catalysis as well as cationic polymerization. Metallocene catalysts are organometallic coordination compounds obtained as a cyclopentadienyl derivative of a transition metal or metal halide. Their use in the polymerization of olefins is well known.

A useful Ziegler-Natta catalysis process is described in U.S. Pat. No. 5,045,597 which is herein incorporated by reference. The Ziegler-Natta method of polymerization requires the presence of a catalyst which includes a transition metal compound and which also utilizes an aluminum compound as well as an electron donor. Such transition metal compounds include titanium halides such as titanium trichloride and titanium tetrachloride as well as magnesium chloride supported titanium tetrachloride, magnesium alkoxide supported titanium tetrachloride and certain metallocenes of zirconium, titanium, and hafnium which are known from the art to polymerize α-olefins. The aluminum compound is usually an organo aluminum compound which is preferably selected from the group consisting of trialkyl aluminum, dialkyl aluminum halides, alkyl aluminum sesquihalides and alkyl aluminum dihalides, and aluminoxanes. There are a wide variety of electron donors which can be used and they are usually oxygen or nitrogen containing compounds such as ethers, esters, ortho ethers, alkoxysilicon compounds, and heterocyclic aromatic nitrogen compounds.

The Ziegler-Natta polymerization may be conducted in neat monomer, by solvent polymerization, or by vapor phase polymerization. Generally, polymerization is conducted at a temperature of from 30° C. to 100° C. under a pressure of from atmospheric to the vapor pressure of the 1-alkenyl functionalized monomer at the polymerization temperature and optionally in the presence of a molecular weight control agent such as hydrogen.

If a soft, thermoplastic elastomer or a tough, impact resistant plastic composed of an amorphous polymer backbone and glassy or semicrystalline polymer grafts as described above is desired, then it is important that the catalyst which is chosen is one which tends to produce amorphous polymers. Such catalysts are described in U.S.

Pat. Nos.5,122,494, 5,188,767, 5,089,573, 5,118,768, 4,874,737, 4,971,936, and 5,229,477, which are all herein incorporated by reference. A preferred catalyst for use herein is described in U.S. Pat. No. 5,122,494. The catalyst is formed by contacting, in the presence of an inert diluent, an alkyl aluminum halide halogenating agent with a complex magnesium-containing, titanium-containing alkoxide compound prepared by reaction of magnesium alkoxide, titanium tetra-alkoxide and a phenolic compound. The complex alkoxide compounds are of somewhat variable stoichiometry but have the general illustrative formula $$Mg_3Ti(OR)_8X_2$$

wherein R independently is alkyl of up to four carbon atoms inclusive and X independently is a monovalent anion derived from a phenolic compound as described below. The diluent is then removed to produce, as a particulate solid, the complex alkoxide compound. This solid is treated with alkyl aluminum halide to produce the olefin polymerization catalyst.

The preferred alkoxides are magnesium ethoxide and titaniumtetraethoxide. The phenolic compound is selected from phenol or an activated phenol (a monohydroxylic phenol of one aromatic ring having aromatic ring substituents other than hydrogen which serve to alter the pKa of the phenolic compound). Suitable phenolic compounds are phenol, o-cresol, and 2,6-di-t-butyl-4-methylphenol (BHT).

The α-olefin and the functionalized monomer may be cationically polymerized by reacting them in the presence of a cationic polymerization initiator in the presence of a Lewis acid and, generally, an electron donor. The Lewis acid and the electron donor may be complexed together. Lewis acids which can be utilized herein include metal halides, such as aluminum trichloride (and molten salts containing aluminum trichloride), boron trichloride, boron trifluoride and titanium tetrachloride, and organometallic derivatives, such as ethylaluminumdichloride and triethyl aluminum, and oxyhalides, such as phosphorous oxychloride. Electron donors which are useful herein include alkyl amines, pyridines, such as 2,6-lutidine and 2,4,6-collidine, triaryl or trialkyl phosphines, benzaldehyde, and veratrole. The cationic polymerization initiators are generally taken from the group consisting of tertiary alkyl halides such as t-butylchloride and triphenymethylfluoride.

The preferred Lewis acids are aluminum trichloride and boron trichloride because of their higher activity. The preferred electron donors are 2,6-lutidine and benzaldehyde because they have been shown to give random copolymers and highly amorphous polymers, respectively (U.S. Pat. No. 5,134,209 and U.S. Pat No. 5,229,471). The preferred cationic polymerization initiators are cumyl-type derivatives like cumylchloride, alkoxide, or aliphatic tertiary chlorides.

The cationic polymerization may be a batch, semi-continuous, or a continuous process. Generally, the polymerization is carded out at a temperature of from about −100° to about 0° C. under a pressure of from 0 to 10 atm. Another method for copolymerizing the α-olefins and the functionalized monomers is free radical polymerization.

The α-olefin/functionalized monomer copolymers are used in the present invention as precursors to making the graft block copolymers of the present invention. These copolymers are generally characterized in that they are high molecular weight copolymers with a random distribution of the monomer components and contain 0% unsaturation. They have other uses as modifiers for polyolefins, such as polypropylene, polyethylene, and polybutylene, as a way to incorporate impact resistance and/or polarity into those polymers or in blends of those polymers. The 1-alkenyl alkyl silanes may be homopolymerized by the above processes as well. Such 1-alkenyl alkyl silane homopolymers are characterized in that they may have high melting points and may exhibit crystallinity because of chain and tacticity control.

The copolymers produced are then metallated ("lithiated" when lithium is the metal) by reaction with a metal alkyl or aryl compound, especially alkyl lithium (RLi) compounds such as sec-butyl lithium or n-butyllithium in the presence of a metallation activator. The RLi compound lithiates (metallates) one of the methyl groups in the —SIR$_3$ moiety to give —Si(R)$_2$CH$_2^{31}$ Li$^+$which then serves as a subsequent initiation site for anionically polymerizable monomers. The activator is required to catalyze the metallation reaction. Suitable activators include tertiary aliphatic amines, chelating tertiary diamines, triamines, and the like. Preferred activators include dipiperidinoethane and TMEDA. The lithiation reaction is generally carded out in solution at the following conditions: 25° C. for 16 hours or 50° C. for 1 hour. Once the lithiation reaction is complete, there will be a number of lithiated sites on the copolymer which are available for the growth of anionically polymerized polymer side chains.

Any anionically polymerizable monomer should be effective in this invention. Particular monomers which can be used include acrylamides, acrylonitriles, nitrobutene, vinylisocyanate, anhydrides, methacrylates, including methyl methacrylate, alkyl and aryl acrylates, vinyl pyridines, carbodiimides, lactones, lactams, dienes, styrene and styrene derivatives including alkylstyrenes, halogenated methoxy styrenes and nitrostyrene, as well as 1,3 pentadiene and 1,3-octadiene, cyclic siloxanes, and ethylene. The anionically polymerized polymers included herein include polyethers (polyalkylene oxides, polyfurans, etc.), polyesters, polyacetals, and polyphenylene oxide (PPO and PPE).

Also useful herein are acrylic monomers, especially including those with the structure

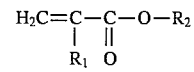

where R$_1$ is hydrogen, phenyl or an alkyl radical which is linear or branched and has from 1 to 10 carbon atoms and R$_2$ is an alkyl radical which has from 1 to 14 carbon atoms, may contain a tertiary amine or an ether linkage, and may be a cyclic hydrocarbon. More specifically, polymer chains which may be used according to the present invention are polymer chains which include acrylic monomers of the formula described above such as alkyl methacrylates or derivatives of alkyl methacrylates such as hydrolyzed alkyl methacrylates or anhydride derivatives thereof. Other suitable acrylic monomers include acrylates, such as t-butyl acrylate, cyclic alkyl methacrylates, such as 2,5-dimethyl-cyclohexyl methacrylate, and acrylates in which the alkyl group contains an ether linkage, such as tetrahydrofuran acrylate.

As is well known, polymers containing both aromatic and/or ethylenic unsaturation can be prepared by copolymerizing one or more polyolefins, particularly a diolefin, by themselves or with one or more alkenyl aromatic hydrocarbon monomers. The copolymers may, of course, be random, tapered, block, star, radial or a combination of these. When the double bonds in the polyolefin are separated by three or more carbon atoms, the ethylenic unsaturation incorporated into the polymer will be contained in a branch extending outwardly from the main polymer chain but when the polyolefin is conjugated at least a portion of the ethylenic unsaturation incorporated into the polymer may be contained in the polymer backbone.

In general, when solution anionic techniques are used, anionically polymerizable polymers including conjugated diolefin polymers, alkenyl aromatic hydrocarbon polymers, and copolymers of conjugated diolefins and alkenyl aromatic hydrocarbons are prepared by contacting the monomer or monomers to be polymerized simultaneously or sequentially with an anionic polymerization initiator. In the present reaction, the lithiated copolymer serves as the anionic polymerization initiator. It is preferred that the reaction take place in a suitable solvent at a temperature within the range from about — 150° C. to about 300° C., preferably at a temperature within the range from about 0° C. to about 100° C.

Conjugated diolefins which may be polymerized anionically include those conjugated diolefins containing from 4 to about 12 carbon atoms such as 1,3-butadiene, isoprene, piperylene, methylpentadiene, phenylbutadiene, 3,4-dimethyl- 1,3-hexadiene, 4,5-diethyl- 1,3-octadiene and the like. Conjugated diolefins containing from 4 to about 8 carbon atoms are preferred for use in such polymers. Alkenyl aromatic hydrocarbons which may be copolymerized include vinyl aryl compounds such as styrene, various alkyl-substituted styrenes, alkoxy-substituted styrenes, 2-vinyl pyridine, 4-vinyl pyridine, vinyl naphthalene, alkyl-substituted vinyl naphthalenes and the like.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetratin, decalin and the like; linear and cyclic ethers such as methyl ether, methyl ethyl ether, diethyl ether, tetrahydrofuran and the like; ketones such as methyl ketone (acetone), methyl ethyl ketone, ethyl ketone (3-petanone) and the like.

The polymerization of the anionic polymer side chain growing from the copolymer must be terminated by the addition of a chain terminating agent. Alcohols are commonly used and hydrogen may also be used. It is important that the living polymer chain be terminated so that no further reaction can take place at that site.

The most preferred embodiment of the present invention is a saturated graft block copolymer which is produced without the necessity for a hydrogenation step. Saturated graft block copolymers are produced herein when the anionically polymerized monomer is one which does not contain olefinic unsaturation. Examples are vinyl aromatic hydrocarbons, particularly styrene, and vinylpyridines, t-butylmethacrylate, and hexamethylcyclotrisiloxane. When these monomers are utilized in the third step of the process of the present invention, the result is a completely saturated graft block copolymer with 0% unsaturation in both the backbone and pendant portions of the molecule.

The final step of the process is accomplished, for example, by growing the living polymer chains from the lithiated α-olefin/1-alkenyl alkyl silane copolymer by initiation and subsequent polymerization from the lithiated sites of the SiMe₃ moieties with the anionically polymerizable monomer. This is accomplished by reacting the copolymer and the monomer in a suitable solvent at a temperature of 0° C. to 100° C. and a pressure of 1 atm to 10 atm. This step is allowed to proceed from 30 min. to 3 hours. The process is similar for other polymers containing other backbone functionalities.

The copolymerization of the α-olefin and the functionalized monomer produces a polymer with a saturated olefinic backbone having pendant —(—CH₂—)ₘ— chains having the functional group attached thereto which may be a terminal group or which may be in the internal portion of the chain. Such copolymers may be represented by the following when the monomer is a 1-alkenyl alkyl or aryl silane:

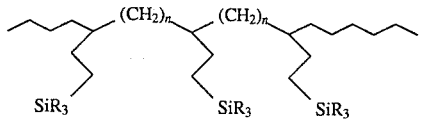

The lithiation reactants, the alkyl lithium compound and the lithiation activator, react with these copolymers at the alkyl or arylsilane sites and the polymer chain adds lithium and becomes an anionic polymerization initiator from which a monomer can polymerize anionically until it becomes a pendant side chain. In the case when styrene monomer is utilized to grow polystyrene side chains, the above copolymer is converted to a saturated graft block copolymer with the following formula:

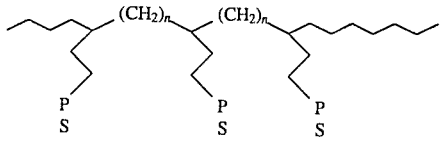

When the appropriate backbone polymer, graft polymer, and weight fraction of graft polymer are chosen, polymers of the present invention are excellent thermoplastic elastomers. For example, the block graft copolymer as exemplified in the above formula is strong, soft, and tacky with a low $T_g$. Other thermoplastic elastomers within the scope of the invention include those with other types of polymeric grafts which are glassy or semicrystalline and phase separate from the backbone polymer forming a dispersed phase. These include block copolymer grafts, such as polystyrene-b-polybutadiene, or polystyrene-b- polyisoprene, vinylpyridine, and alkylmethacrylate grafts.

When a thermoplastic elastomer with substantial strength is desired, it is important to control the number of pendant anionic polymer side chains. If there are, on average, less than 2 side chains per backbone polymer, then the resulting graft block copolymer will have low strength. The number of side chains is controlled by the composition of the backbone copolymer and the amount of functional olefin comonomer which is metallated to form sites for growing anionic polymer grafts. It is highly preferred that the graft block copolymer contain on average from 2 to 200 pendant anionic polymer side chains per backbone polymer so long as these pendant groups do not exceed 50 percent by weight of the total composition. This is preferred because when the graft block copolymer contains greater than 50% by weight anionic polymer side chains, the glassy or semicrystalline graft polymer becomes the matrix with dispersed amorphous backbone and the resulting graft block copolymer is no longer elastomeric, but will behave like a toughened plastic.

The polymers made according the present invention have an extremely wide variety of uses. Graft block copolymers which are thermoplastic elastomers may be used in all of the applications for which other thermoplastic elastomers have been used. For example, other thermoplastic elastomers are useful in adhesives, sealants, coatings, polymer modification (blending with other thermoplastic polymers such as polyolefins, polycarbonate, polyphenyloxide, etc. to enhance or alter the properties thereof), polymer asphalt modification, polymer blend compatibilization, tie layers, viscosity index improvers, and the like. The polymers may also be crosslinked to provide additional strength and environmental, chemical, and thermal resistance for enhanced utility in asphalt modification, fibers, films, and adhesives. Graft block copolymers which are tough impact resistant plastics or stiff plastics may be used in molded and extruded goods, fibers, films, polymer modification, tie layers, and polymer blend compatibilization.

EXAMPLES

Example 1 (ZNA14 Precursor)

Allyl trimethyl silane was copolymerized with a $C_{16-18}$ monomer and 1-octene. Sixty milligrams of a $Mg_8(OC_2H_5)4TiCl_4(benzaldehyde)_2$. $TiCl_4$ (titanium content about $_{4.1}$ percent), catalyst was placed in a quart bottle with 0.54 grams of 25 percent ethyl aluminum dichloride in toluene. After five minutes, 0.36 grams of 25 percent triethyl aluminum in toluene (aluminum/titanium ratio=57.7) was added followed by 56 grams of a 1:1:1 (by weight) mixture of allyl trimethyl silane, Neodene 1418 (a mixture of $C_{14}$, $C_{16}$, and $C_{18}$ α-olefins) from Shell Chemical Company) and 1-octene. The polymerization was carried out by stirring for an hour at room temperature and then holding the resulting viscous solution in a 65° C. oil bath overnight. The pale green gel was dissolved in toluene and then precipitated in warm isopropanol, washed with isopropanol, dried in a 60° C. oven under vacuum overnight and then placed in a high vacuum oven at 50° C. for a day. 25.6 grams of a colorless, sticky polymer was produced. The NMR analysis showed that the polymer contained 20.3 percent silane, 38.0 percent $C_8$ and 41.7 percent $C_{14-18}$.

Example 2 (ZNA16 Precursor)

An alkyl silane functionalized α-olefin copolymer was made according to the following procedure. 120 milligrams of the catalyst described in Example 1 was added to a one quart bottle and then 1.08 grams of 25 percent ethyl aluminum dichloride in toluene was added. After five minutes, 0.72 grams of 25 percent aluminum triethyl in toluene was added. Then 100 grams of octadecene was added plus 10 grams of allyl trimethyl silane. The mixture was stirred for one hour at room temperature and then stirred in a 65° C. oil bath overnight. The polymer was poured into warm isopropyl alcohol and coagulated and then washed with clean isopropyl alcohol and vacuum dried at 60° C.

Example 3

Styrene monomer was grafted onto α-olefin/alkyl silane copolymers. The monomers are described in Table I below. The reaction conditions were as follows: All reactions were carried out in glass polymerization bottles under nitrogen. The bottle caps were fitted with septums. The polymers were dissolved in treated cyclohexane (about 5 percent solids). The resulting cement was titrated, as described below, to remove anionic polymerization impurities. RLi and TMEDA were then syringed into the bottles (RLi:TMEDA=1:1 molar basis; RLi=s-buLi). Reaction time was 16 hours @ ambient temperature. Then styrene monomer was syringed in and polymerized 30 minutes @ 60° C., terminated with isopropyl alcohol (IPA), coagulated into 6 volumes of acetone and vacuum dried.

The titration procedure used was: an aliquot of cement was titrated with s- buLi in the presence of styrene until $PS^{31}Li^+$ color end point was obtained. The polystyrene content (PSC) was determined as percent weight in the product by using NMR. The lithiation efficiency was determined by GPC of the reaction mixture after styrene polymerization was complete by comparing the peak areas (UV detector) for grafted styrene vs. homopolystyrene.

TABLE I

| Sample No. | α-$C_n^=$ Monomer(s) | Target PSC (%) | Actual PSC (%) | Lithiation Efficiency (%) |
|---|---|---|---|---|
| ZNA-14A | $C_8/C_{14,16,18}$ | 53% | 51% | 93% |
| ZNA-16D | $C_{18}$ | 52% | 41% | 66% |
| ZNA-16H | $C_{18}$ | 35% | 31% | 88% |

[1]PSC = % weight styrene in product

Example 4

Three different runs were carried out with a copolymer made with octadecene and allyl trimethylsilane made as described above. The reaction conditions were similar to those noted in Table I with the following exceptions: lithiation temperature=50° C. for reaction times noted in this table. Lithiation efficiency determined by gel permeation chromatography (GPC) of reaction mixture after styrene polymerization (ratio of GPC peak areas for grafted styrene vs. homopolystyrene). HPS MW=homopolystyrene block molecular weight (from GPC). MW of bound styrene block is assumed to be the same.

TABLE II

| Sample No. | Lithiation Rx. Time (min.) | Lithiation Efficiency (%) | HPS MW |
|---|---|---|---|
| ZNA-16A | 15 | 49% | 8,400 |
| ZNA-16B | 30 | 60% | 7,900 |
| ZNA-16C | 60 | 69% | 8,200 |

The results shown above in Tables I and II show that very high lithiation efficiencies can be obtained with allyltrimethylsilanes without the use of potassium alkoxides as is the case for Dow U.S. Pat. No. 4,761,456 with EPDM (olefinic) lithiation. Much better molecular weight (MW) control of the polystyrene is achieved.

Comparative Examples

The following examples demonstrate the superiority of our polymers vs. diene lithiation (EPDM) as well as our process superiority.

Example 5: Comparative Example 1

This experiment was run as a control experiment to determine the effectiveness of —$Si(Me)_2CH_2$—$Li^-$ as an initiator for styrene. This is the initiating group in our lithiated polymers.

To a polymerization bottle in a dry box was added 100 g cyclohexane solvent and 2 g $Me_4Si$ (22 mmoles). To this was added 2 mmoles S-buLi and 2.2 mmoles TMEDA. This lithiation reaction was allowed to proceed for 2 days at 25° C., conditions previously demonstrated to yield >90% lithiation of $Si(Me)_3$ groups.

Then 10 g styrene monomer was added and polymerized 30 min at 60° C. (target PS MW-5000) and then terminated with 1PA. The GPC analysis shows PS MW =7700 with molecular weight distribution (MWD)=1.04.

Example 6: Comparative Example 2

Example 14 from U.S. Pat. No. 4,761,456 shows that PS MWD=1.32 (from analysis of homopolystyrene (patentees said grafted PS assumed to have the same MWD=1.32). The target PS MW=1800 but the actual PS MW=9,400.

TABLE III

|  | MWD | Target PS MW | Actual PS MW | MW Variation from Target |
|---|---|---|---|---|
| Present invention (Ex. 5) | 1.04 | 5000 | 7700 | 54% |
| Prior art (Ex. 14 from U.S. 4,761,456) | 1.32 | 1800 | 9400 | 420% |

The molecular weight distribution of the polymer of this invention is very much better than that of the reference. In addition, the polystyrene graft molecular weight variation from the target is ⅛ of that of the reference. These results prove that the process of the present invention is vastly superior in providing precision block graft copolymers.

The following experiments were carried out to demonstrate the superiority and different character of the polymers of the present invention compared to polymers in the prior art. EPDM (Nordel 1320) has about 4% unsaturation from 1,4-hexadiene comonomer of which 2.7% is "out-of-chain" and 1.3% is "in-chain."

Upon lithiation at allylic positions, the "out-of-chain" olefin can be lithiated either at the terminal carbon (type A) or at the internal carbon (type B). The "in-chain" olefin will be lithiated to give type C. Upon growing the styrene block, the polymer will contain PS grats located in 3 distinct locations (again, types A, B, or C). Upon ozonolysis (cleavage of the residual olefin), the fate of the 3 PS graft types and of the EPDM itself is as follows.

Type A and C gratis will be cleaved by $O_3$, thus resulting in loss of strength (backbone cleavage). Only type B will survive ozonolysis. However, there are 1.3% "in-chain" olefins, most of which are not grafted sites. These too will undergo scission with $O_3$ resulting in severe backbone degradation. Since the systems of the present invention have zero residual unsaturation, they show superior resistance to $O_3$.

Example 7 — Comparative Example 3 (similar to Ex. 14 from U.S. Pat. No. 4,761,456) (ZNA-15)

EPDM (Nordel 1320) in cyclohexane at 8.7% solids was lithiated for 3 hours at 10° C. with s-buLi/TMEDA (0.9:1 mmoles/mmole). Then styrene monomer was added (target MW=3500) and polymerized at 50° C. for 30 minutes. The reaction was then terminated with methanol, coagulated into 3 volumes of acetone, dried, and analyzed. PS MW=5400; polystyrene content=31% by wt. in EPDM-g-PS product (about 60% grafted and 40% homopolystyrene resulting from incomplete lithiation of EPDM). A 0.2% wt. solution of the above polymer in carbon disulfide was treated with an ozone gas stream at −80° C. for five minutes and then purged with $N_2$ gas until the blue color of ozone disappeared. It was warmed to room temperature and several grams of triphenylphosphine were added to decompose any reactive oxidation products. The reaction product was analyzed by gel permeation chromatography (GPC) and compared to its GPC before ozonolysis.

Before ozonolysis, the polymer had a strong EPDM-g-PS peak at about 15 minutes retention time and a smaller peak of residual homopolystyrene at about 21 to 22 minutes retention time. After ozonolysis, severe degradation of the EPDM-g-PS peak and a large increase in the homopolystyrene peak was observed by GPC. Thus only 7% of the grafted PS survived the ozonolysis experiment. This will result in almost complete loss of properties.

Example 8 — Comparative Example 4

The polymer from example 3 was ozonolyzed as described in example 7 for EPDM-g-PS and the GPC's were compared for this material both before and after ozonolysis. Unlike the EPDM-g-PS examples, there is no evidence of degradation of the invention polymer after ozonolysis. For the peak areas, it was determined that 100% of the material survived the ozone experiment (0% degradation).

Thus, the superior stability of these materials over EPDM-g-PS has been demonstrated. Similar improvements in thermal and UV stability can also be expected.

Example 9

Polystyrene was grafted onto a polyoctene polymer backbone containing about 1 mole % 1,3,7-octatriene in which a significant fraction of this monomer has residual pendant diene moieties along the polyalpha-olefin (PAO) chain. The pendant diene units were reacted with s-buLi to form a dienyl⁻Li⁺ species from which polystyrene was polymerized to form a polyoctene/polystyrene graft block copolymer. The polyoctene cement was titrated as described in Example 3. s-BuLi was then added to the cement in the presence of TMEDA (TMEDA:Li=1:1). After 30 seconds, styrene monomer was added and polymerization was allowed to proceed for 30 minutes at 50° C. The living polymer was terminated and isolated as described in Example 3.

The resulting graft block copolymer had a polystyrene content of 8.6 percent and a homopolystyrene molecular weight (determined by GPC analysis of the crude reaction mixture before polymer isolation) of 11,000 g/mole. Molecular weight of grafted polystyrene is assumed to be the same.

TABLE IV

| Sample No. | PSMW[a] | PSC[b] |
|---|---|---|
| ZNA-9E | 11,000 | 8.6% |

[a]from GPC
[b]PSC = polystyrene content (% weight in product) determined by NMR Example 10— (ZNX-SA)

A precursor functionalized rubber (ZNA-14) was synthesized as described in Example 1. The synthesis of a high PSC graft copolymer was carried out as follows.

1.9 mmoles of s-BuLi and 1.9 mmoles TMEDA were added to 80.6 g of polymer cement containing 3.6 g of ZNA-14 precursor in cyclohexane solvent. The lithiation reaction was allowed to proceed for 16 hours at room temperature. Then 14.5 g of styrene monomer was added and the polymerization was carried out for 15 minutes at 70° C. and then terminated with 0.1 cc isopropyl alcohol (IPA). The polymer was precipitated from solution with IPA/MeOH, redissolved in toluene, coagulated into 4 volumes of acetone, collected and dried. GPC showed that the PS MW=10,700 and NMR showed that the product graft copolymer contained 76 percent by weight polystyrene. Instron tests showed the product to have a tensile strength of 1130±1.1 percent and a Young's Modulus of 84,800±9500.

We claim:

1. A process for producing graft block copolymers which comprises:

(a) copolymerizing an α-olefin with an a 1-alkenyl monomer containing a functional group from which an anionically polymerized polymer is grown to produce a graft block copolymer, (b) metallating the functional groups on the copolymer by reaction with a metal alkyl or metal aryl compound in the presence of a metallation activator, and (c) reacting the metallated copolymer with at least one anionically polymerizable monomer to form a graft block copolymer having a saturated olefinic backbone with pendant anionic polymer side chains.

2. A graft block copolymer made according to the process of claim 1.

3. The graft block copolymer of claim 2 wherein the anionically polymerizable monomer is selected from the group consisting of acrylamides, acrylonitriles, nitrobutene, vinylisocyanate, anhydrides, methacrylates, including methyl methacrylate, alkyl and aryl acrylates, vinyl pyridines, carbodiimides, lactones, lactams, dienes, styrene, alkylstyrenes, halogenated methoxy styrenes and nitrostyrene, as well as 1,3 pentadiene and 1,3-octadiene, cyclic siloxanes, and ethylene.

4. The graft block copolymer of claim 2 wherein the anionic polymer side chains are completely saturated.

5. The graft block copolymer of claim 4 wherein the anionically polymerizable monomer is styrene.

6. The graft block copolymer of claim 2 wherein the 1-alkenyl functionalized monomer is selected from the group consisting of monomers of the formula $$CH_2=CH-(CH_2)_n-Y$$

where $n \geq 0$ and Y is selected from the group consisting of alkylsilane groups, arylsilane groups, cyclic alkyl containing phosphorous, phosphorous groups of the formula $P-Z_2$ where Z is alkyl, aryl, or combinations thereof.

7. The graft block copolymer of claim 6 wherein the 1-alkenyl functionalized monomer is a alkyl or aryl silane of the formula $$CH_2=CH-(CH_2)_n-SiR_mH_x$$

where $n \geq 0$ up to 12, m is 2 or 3, x is 0 or 1, x+m=3, and R is alkyl or aryl.

8. The graft block copolymer of claim 7 wherein the silane is allyltrimethylsilane or allyldimethylsilane.

9. A crosslinked product comprising the graft block copolymer of claim 2 which has been either chemically or radiation crosslinked.

10. The graft block copolymer of claim 2 which is comprised of an amorphous polyolefin backbone and phase separated glassy or semicrystalline anionically polymerized grafts which comprise 50 percent or less of the total polymer composition.

11. The graft block copolymer of claim 2 which is comprised of an amorphous polyolefin backbone and continuous glassy anionically polymerized grafts which comprise more than 50 percent of the total polymer composition.

12. A saturated graft block copolymer having a polymer backbone comprised of a copolymer of an α-olefin and a 1-alkenyl halosilane monomer of the formula $$CH_2=CH-(CH_2)_n-SiX_3$$

where $n \geq 0$, X is halogen, R, or H, or combinations thereof, and R is alkyl or aryl, and at least one X must be halogen, which has been reacted with an anionically polymerizable monomer such that at least one living polymer chain grows from at least one X group in the halosilane to form a saturated graft block copolymer with the following formula.

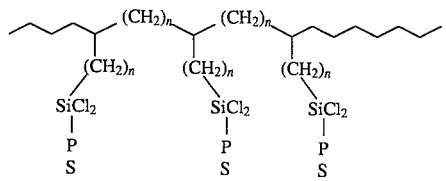

* * * * *